(12) United States Patent
Huo et al.

(10) Patent No.: US 10,867,386 B2
(45) Date of Patent: Dec. 15, 2020

(54) METHOD AND APPARATUS FOR DETECTING A SALIENT POINT OF A PROTUBERANT OBJECT

(71) Applicants: MICROSOFT TECHNOLOGY LICENSING, LLC, Redmond, WA (US); Qiang Huo, Beijing (CN); Yuseok Ban, Seoul (KR)

(72) Inventors: Qiang Huo, Beijing (CN); Yuseok Ban, Seoul (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 16/098,403

(22) PCT Filed: Jun. 30, 2016

(86) PCT No.: PCT/CN2016/087989
§ 371 (c)(1),
(2) Date: Nov. 1, 2018

(87) PCT Pub. No.: WO2018/000366
PCT Pub. Date: Jan. 4, 2018

(65) Prior Publication Data
US 2019/0139222 A1   May 9, 2019

(51) Int. Cl.
*G06K 9/00* (2006.01)
*G06T 7/11* (2017.01)
(Continued)

(52) U.S. Cl.
CPC ............ *G06T 7/11* (2017.01); *G06K 9/00355* (2013.01); *G06K 9/56* (2013.01); *G06N 7/005* (2013.01);
(Continued)

(58) Field of Classification Search
CPC ......... G06K 2009/4666; G06K 9/4642; G06K 9/56; G06K 9/6202; G06K 9/00362;
(Continued)

(56) References Cited

U.S. PATENT DOCUMENTS 8,121,351 B2   2/2012   Katz et al.
8,503,760 B2   8/2013   Lee et al.
(Continued)

FOREIGN PATENT DOCUMENTS

| CN | 103208115 A | 7/2013 |
|---|---|---|
| CN | 103907123 A | 7/2014 |
| CN | 105556539 A | 5/2016 |

OTHER PUBLICATIONS

Niu, Yuzhen, et al. "Leveraging stereopsis for saliency analysis." 2012 IEEE Conference on Computer Vision and Pattern Recognition. IEEE, 2012. (Year: 2012).*
(Continued)

*Primary Examiner* — Li Liu
(74) *Attorney, Agent, or Firm* — Schwegman Lundberg & Woessner, P.A.

(57) ABSTRACT

An image processing method and an apparatus (300) are provided, the method includes: obtaining a depth image of a protuberant object (210); selecting a plurality of test points placed on a circle around a pixel in the depth image as a center point of the circle; calculating a protuberance value of the center point based on a comparison between the depth value of the center point and the depth value of each of the selected test points (240); and determining one or more salient points of the protuberant object by using the protuberance value of each pixel in the depth image (250).

19 Claims, 7 Drawing Sheets (51) Int. Cl.
*G06T 7/60* (2017.01)
*G06K 9/56* (2006.01)
*G06T 7/50* (2017.01)
*G06N 20/10* (2019.01)
*G06N 7/00* (2006.01)
*G06K 9/46* (2006.01)

(52) U.S. Cl.
CPC ............... *G06N 20/10* (2019.01); *G06T 7/50* (2017.01); *G06T 7/60* (2013.01); *G06K 2009/4666* (2013.01); *G06T 2207/10028* (2013.01); *G06T 2207/20164* (2013.01)

(58) Field of Classification Search
CPC ............. G06T 2207/10028; G06T 7/11; G06T 2207/20164; G06T 7/194
See application file for complete search history.

(56) References Cited

U.S. PATENT DOCUMENTS

| 8,970,479 | B1 | 3/2015 | Chang et al. | |
|---|---|---|---|---|
| 9,881,217 | B2* | 1/2018 | Wang | G06K 9/00369 |
| 2012/0269384 | A1* | 10/2012 | Jones | G06K 9/00201 382/103 |
| 2014/0169639 | A1* | 6/2014 | Fu | G06T 7/20 382/107 |
| 2014/0204013 | A1 | 7/2014 | O'prey et al. | |
| 2015/0016679 | A1* | 1/2015 | Cao | G06K 9/4642 382/103 |
| 2015/0253864 | A1 | 9/2015 | Parkhomenko et al. | |
| 2015/0256815 | A1 | 9/2015 | Grafulla-gonzalez | |
| 2015/0332466 | A1* | 11/2015 | Hu | G06K 9/00268 382/103 |
| 2016/0098843 | A1 | 4/2016 | Hashiguchi | |
| 2016/0110882 | A1* | 4/2016 | Paik | G06T 7/44 382/103 |
| 2016/0165126 | A1 | 6/2016 | Mishima et al. | |

OTHER PUBLICATIONS

Heikkilä, Marko, Matti Pietikäinen, and Janne Heikkilä. "A texture-based method for detecting moving objects." Bmvc. vol. 401. 2004. (Year: 2004).*
"Extended European Search Report Issued in European Patent Application No. 16906766.7", dated Feb. 3, 2020, 6 Pages.
Li, et al., "A New Fingertip Detection and Tracking Algorithm and its Application on Writing-in-the-air System", In Proceedings of the 7th International Congress on Image and Signal Processing, Oct. 14, 2014, pp. 457-462.
Liang, et al., "3D Fingertip and Palm Tracking in Depth Image Sequences", In Proceedings of the 20th ACM international conference on Multimedia, Oct. 29, 2012, pp. 785-788.
Achanta, et al., "Saliency Detection Using Maximum Symmetric Surround", In Proceedings of IEEE 17th International Conference on Image Processing, Sep. 26, 2010, pp. 2653-2656.
Borji, et al., "Analysis of Scores, Datasets, and Models in Visual Saliency Prediction", In Proceedings of the IEEE International Conference on Computer Vision, Dec. 1, 2013, pp. 921-928.
Borji, et al., "Salient Object Detection: A Benchmark", In Journal of IEEE Transactions on Image Processing, vol. 24, Issue 12, Dec. 2015, pp. 5706-5722.
Cheng, et al., "Global Contrast Based Salient Region Detection", In Journal of IEEE Transactions on Pattern Analysis and Machine Intelligence, vol. 37, No. 3, Mar. 1, 2015, pp. 569-582.
Ciptadi, et al., "An in Depth View of Saliency", In Proceedings of British Machine Vision Conference, Sep. 2013, 11 Pages.
Duan, et al., "Visual Saliency Detection by Spatially Weighted Dissimilarity", In Proceedings of Computer Vision and Pattern Recognition, Jun. 20, 2011, pp. 473-480.

Harel, et al., "Graph-Based Visual Saliency", In Proceedings of the 19th International Conference on Neural Information Processing Systems, Dec. 4, 2006, 8 Pages.
Hou, et al., "Image Signature: Highlighting Sparse Salient Regions", In Journal of IEEE Transactions on Pattern Analysis and Machine Intelligence, vol. 34, No. 1, Jan. 2012, pp. 194-201.
Hou, et al., "Saliency Detection: A spectral Residual Approach", In Proceedings of IEEE Conference on Computer Vision and Pattern Recognition, Jun. 17, 2007, 8 Pages.
Itti, et al., "A Model of Saliency-Based Visual Attention for Rapid Scene Analysis", In Journal of IEEE Transactions on Pattern Analysis \& Machine Intelligence, vol. 20, Issue 11, Nov. 1998, pp. 1254-1259.
Jiang, et al., "Saliency Detection via Absorbing Markov Chain", In Proceedings of IEEE International Conference on Computer Vision, Dec. 1, 2013, pp. 1665-1672.
Jiang, et al., "Salient Object Detection: A Discriminative Regional Feature Integration Approach", In Proceedings of the IEEE Conference on Computer Vision and Pattern Recognition, Jun. 23, 2013, pp. 2083-2090.
Zhu, et al., "Saliency Optimization from Robust Background Detection", In Proceedings of the IEEE Conference on Computer Vision and Pattern Recognition, Jun. 23, 2014, pp. 2814-2821.
Lang, et al., "Depth Matters: Influence of Depth Cues on Visual Saliency", In Proceedings of European Conference on Computer Vision, Oct. 7, 2012, pp. 101-115.
Murray, et al., "Saliency Estimation Using a Non-parametric Low-Level Vision Model", In Proceedings of Computer Vision and Pattern Recognition, Jun. 20, 2011, pp. 433-440.
Ouerhani, et al., "Computing Visual Attention from Scene Depth", In Proceedings of 15th International Conference on Pattern Recognition, Sep. 3, 2000, pp. 375-378.
Peng, et al., "RGBD Salient Object Detection: A Benchmark and Algorithms", In Proceedings of European Conference on Computer Vision, Sep. 6, 2014, pp. 92-109.
Perazzi, et al., "Saliency Filters: Contrast Based Filtering for Salient Region Detection", In Proceedings of IEEE on Conference Computer Vision and Pattern Recognition, Jun. 16, 2012, pp. 733-740.
Qian, et al., "Realtime and Robust Hand Tracking from Depth", In Proceedings of the IEEE Conference on Computer Vision and Pattern Recognition, Jun. 23, 2014, pp. 1106-1113.
Rahtu, et al., "Segmenting Salient Objects From Images and Videos", In Proceedings of European Conference on Computer Vision, Sep. 5, 2991, pp. 366-379.
Tavakoli, et al., "Fast and Efficient Saliency Detection Using Sparse Sampling and Kernel Density Estimation", In Proceedings of Scandinavian Conference on Image Analysis, May 23, 2011, pp. 666-675.
Wei et al., "Geodesic Saliency Using Background Priors", In Proceedings of European Conference on Computer Vision, Oct. 7, 2012, pp. 29-42.
Wolfe, et al., "What Attributes Guide the Deployment of Visual Attention and How do they Do It?", In Journal of Nature Reviews Neuroscience, vol. 5, No. 6, Jun. 1, 2004, 7 Pages.
Yang, et al., "Saliency Detection via Graph-based Manifold Ranking", In Proceedings of the IEEE Conference on Computer Vision and Pattern Recognition, Jun. 23, 2013, pp. 3166-3173.
Zhang, et al., "Sun: A Bayesian Framework for Saliency Using Natural Statistics", In Journal of Vision, vol. 8, No. 7, Dec. 16, 2008, 20 Pages.
Zhong, et al., "Just Noticeable Difference for 3d Images with Depth Saliency", In Proceedings of 13th Pacific-Rim Conference on Multimedia, Dec. 4, 2012, pp. 414-423.
"Fingertip Detection from Depth Image using Kinect (c# and wpf)", Retrieved from: https://www.codeproject.com/Questions/385741/fingertip-detection-from-depth-image-using-kinect, May 16, 2012, 3 Pages.
Achanta, et al., "Salient Region Detection and Segmentation", In Proceedings of 6th International Conference on Computer Vision Systems, May 12, 2008, 10 Pages.
Bae, et al., "Content-based 3D Model Retrieval using a Single Depth Image from a Low-cost 3D Camera", In Journal of the Visual Computer, vol. 29, Issue 6-8, Jun. 1, 2013, 5 Pages.

(56) References Cited

OTHER PUBLICATIONS

Bayramoglu, et al., "Shape Index SIFT: Range Image Recognition using Local Features", In Proceedings of International Conference on Pattern Recognition, Aug. 23, 2010, pp. 352-355.

Chen, et al., "3D Free-Form Object Recognition in Range Images Using Local Surface Patches", In Proceedings of the 17th International Conference on Pattern Recognition, Jul. 15, 2007, 4 Pages.

Guo, et al., "3D Object Recognition in Cluttered Scenes with Local Surface Features: A Survey", In IEEE Transactions on Pattern Analysis and Machine Intelligence, vol. 36, Issue 11, Nov. 1, 2014, 18 Pages.

Krejov, et al., "Multi-Touchless: Real-Time Fingertip Detection and Tracking Using Geodesic Maxima", In 10th IEEE International Conference and Workshops on Automatic Face and Gesture Recognition, Apr. 22, 2013, 7 Pages.

Lo, et al., "Local Feature Extraction and Matching on Range Images: 2.5D SIFT", In Journal of Computer Vision and Image Understanding, vol. 113, Issue 12, Dec. 1, 2009, pp. 1235-1250.

Lowe, David G., "Distinctive image Features from Scale-Invariant Keypoints", In Proceedings of the International Journal of Computer Vision, vol. 60, Issue 2, Nov. 1, 2004, 20 Pages.

Nascimento, et al., "On the Development of a Robust, Fast and Lightweight Keypoint Descriptor", In Journal of Neurocomputing, vol. 120, Nov. 23, 2013, 6 Pages.

Tang, et al., "Histogram of Oriented Normal Vectors for Object Recognition with a Depth Sensor", In Proceedings of 11th Asian Conference on Computer Vision, Nov. 5, 2012, 14 Pages.

International Search Report and Written Opinion Issued in PCT Patent Application No. PCT/CN2016/087989, dated Mar. 31, 2017, 12 Pages.

\* cited by examiner

METHOD AND APPARATUS FOR DETECTING A SALIENT POINT OF A PROTUBERANT OBJECT

CROSS-REFERENCE TO RELATED APPLICATIONS

This application is a U.S. National Stage Filing under 35 U.S.C. 371 of international Patent Application Serial No. PCT/CN2016/087989, filed Jun. 30, 2016, and published as WO 2018/000366 A1 on Jan. 4, 2018, which application and publication are incorporated herein by reference in their entirety.

BACKGROUND

Humans can quickly and accurately detect visually noticeable foreground object in the scene, known as salient objects, and adaptively focus attention on such perceived important regions. However, this basic intelligent behavior still remains a challenge for computer vision systems when they are asked to identify a salient object in an image. Many approaches to this task have been implemented over the decades.

To date, visual saliency research has mainly investigated color, gradient, and grayscale differences to create saliency models. The saliency models mainly focus on separating or segmenting out a conspicuous object from a background scene, which is commonly known as salient object detection. Such saliency models can be explained by the question of "Where is the salient object in the scene". The salient object detection usually relies on an assumption about the property of object and background, i.e. high appearance contrast between the object and its surrounding region. The contrast-based saliency extracted by these saliency models is not reliable in case the appearance contrast is not high.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

According to an embodiment of the subject matter described herein, an image processing method comprises: obtaining a depth image of a protuberant object; selecting a plurality of test points placed on a circle around a pixel in the depth image as a center point of the circle; calculating a protuberance value of the center point based on a comparison between the depth value of the center point and the depth value of each of the selected test points; and determining one or more salient points of the protuberant object by using the protuberance value of each pixel in the depth image.

According to an embodiment of the subject matter, an image processing apparatus comprises: an obtaining module configured to obtain a depth image of a protuberant object; a calculating module configured to select a plurality of test points placed on a circle around a pixel in the depth image as a center point of the circle, and calculate a protuberance value of the center point based on a comparison between the depth value of the center point and the depth value of each of the selected test points; and a detecting module configured to detect one or more salient points of the protuberant object by using the protuberance value of each pixel in the depth image.

According to an embodiment of the subject matter, a computer system comprises: one or more processors, and a memory storing computer-executable instructions that, when executed, cause the one or more processors to: obtain a depth image of a protuberant object; select a plurality of test points placed on a circle around a pixel in the depth image as a center point of the circle; calculate a protuberance value of the center point based on a comparison between the depth value of the center point and the depth value of each of the selected test points; and determine one or more salient points of the protuberant object by using the protuberance value of each pixel in the depth image.

In various embodiments of the subject matter, the reliability of the detection is improved since the appearance contrast between the object and its surrounding regions exerts less influence on the detection result.

Further, experiment results show the robustness of the detection against rotation and isometric deformation of a depth region, varying viewpoints of a sensor, and low resolution of a depth image.

In addition, computation cost of the detection can be greatly reduced, thus wide applications such as mobile, vehicle, etc. can be implemented in accordance with the embodiments of the subject matter.

Various aspects and features of the subject matter are described in further detail below. And other objects and advantages of the subject matter will become more apparent and will be easily understood with reference to the description made in combination with the accompanying drawings.

BRIEF DESCRIPTION OF THE DRAWINGS

The features, nature and advantages of the subject matter will be more apparent from the detailed description set forth below when taken in conjunction with the drawings in which use of the same reference number in different figures indicates similar or identical items.

DETAILED DESCRIPTION

The subject matter will be described with respect to exemplary embodiments and with reference to certain drawings, but the subject matter is not limited thereto. Rather, the intention is to cover all modifications, equivalents and alternatives falling within the spirit and scope of the claimed subject matter. The drawings described are only schematic and are non-limiting. In the drawings, the size of some of the elements may be exaggerated and not drawn on scale for illustrative purposes.

As used herein, the term "a" or "an" is to be read as "at least one". the term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below. A definition of a term is consistent throughout the description unless the context clearly indicates otherwise.

Figure 1:
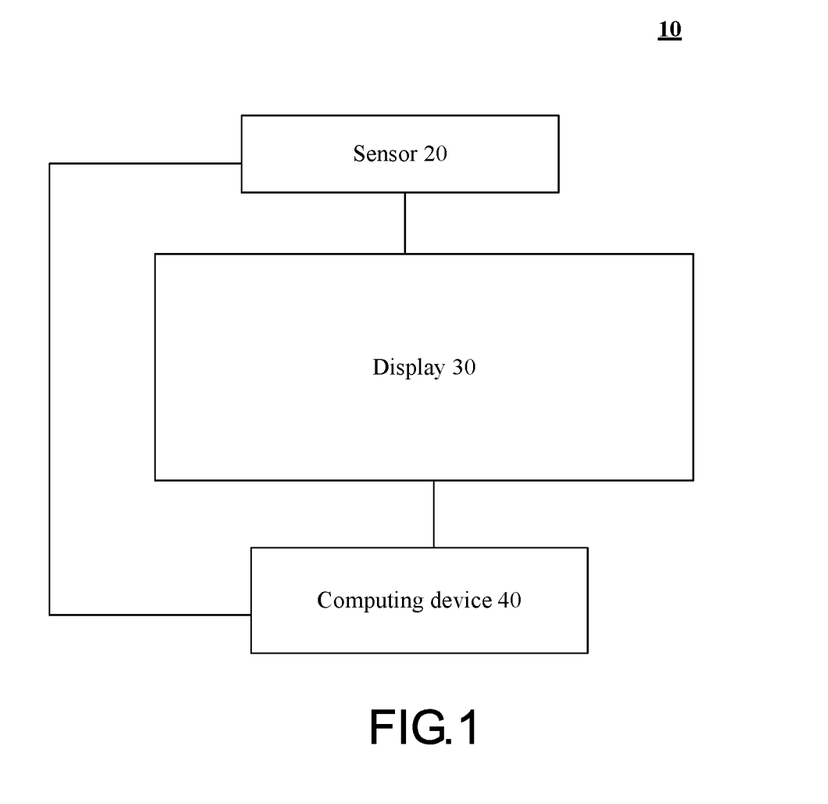
FIG. 1 illustrates a block diagram of an exemplary environment 10 in which embodiments of the subject matter may be utilized.

FIG. 1 illustrates a block diagram of an exemplary environment 10 which may take advantage of the image processing techniques according to embodiments of the subject matter described herein. It is to be understood that the structure and functionality of the environment 10 are described only for the purpose of illustration without suggesting any limitations as to the scope of the subject matter described herein.

The environment 10 may include a sensor 20, a display 30 and a computing device 40.

The sensor 20 can be used to obtain a depth image. A depth image is composed of pixels, each pixel having a pixel value (i.e. depth value) indicating the distance to a point in a scene from a specific point, the specific point normally being associated with the sensor for sensing depth information. For example, the sensor can be commercially available sensors such as those used in Kinect and Dense Stereo, which are typically low-cost low-resolution sensors. It should be appreciated that any kind of sensor 20 can be employed as long as depth information can be obtained by means of the sensor. Additionally, a RGB camera, which is not shown in the FIG. 1 for sake of not obscuring the illustration of embodiments of the subject matter, can be deployed to obtain the RGB images.

In a scenario, a user may interact with an application (e.g. a game, an operating window, or the like) displayed on the display 30 over the air through e.g. fingertip pointing or writing, or hand acting, or the like. The computing device 40 may detect the fingertip consistently and track the fingertip pointing or writing by taking advantage of image process technique according to embodiments of the subject matter. In another scenario, the computing device 40 may detect a hand and track the hand acting by taking advantage of image process technique according to embodiments of the subject matter. It should be appreciated that an object that can be detected according to embodiments of the subject matter is not limited a fingertip, a finger or a hand.

Figure 2:
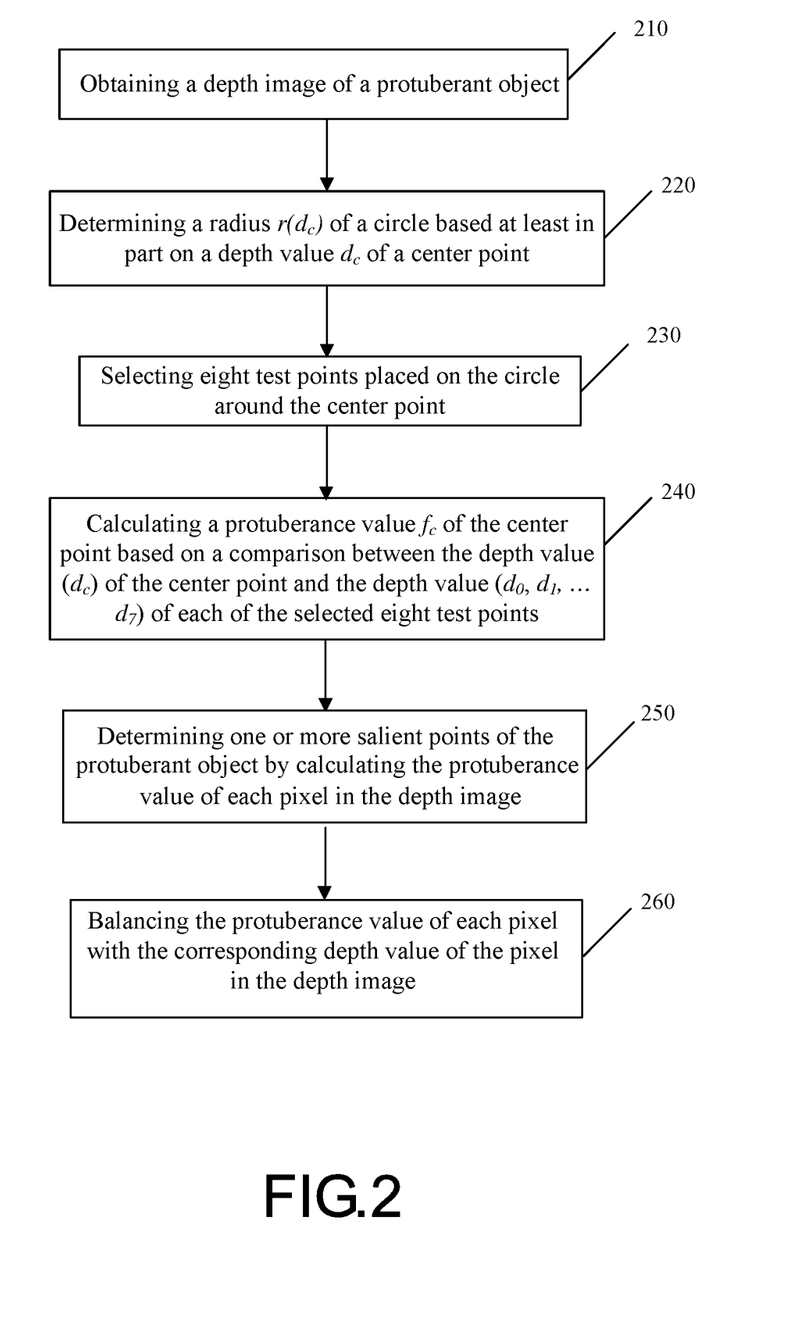
FIG. 2 illustrates a flowchart of a method for detecting a protuberant object according to one embodiment of the subject matter.

FIG. 2 is a flowchart of a method for detecting a protuberant object according to one embodiment of the subject matter. The protuberant object herein refers to an object having a protuberant shape. The protuberant shape can be, e.g. a fingertip of a hand, a gunpoint, a tip of a stick, and so on.

In block 210, a depth image of a protuberant object can be obtained. For example the depth image can be obtained by using three-dimensional (3D) sensing technologies, e.g. through the sensor 20. In a scenario, depth images can be obtained while the sensor 20 captures the depth images in real time. In another scenario, depth images can be obtained from a storage device in which the depth images are pre-stored or buffered.

The obtained depth image may be a whole depth image, and may also be a Region Of Interest (ROI) of the whole image, that is, a partial depth image. We may collectively refer to the whole or partial depth image as a depth image for sake of simplification. The ROI can be set by using any approach as long as the region containing the interesting object (e.g. a hand) is elected.

A pixel in the depth image can be selected as a center point of a circle. The radius $r(d_c)$ of the circle can be determined based at least in part on the depth value $d_c$ of the center point, as shown in block 220. The smaller the depth value $d_c$ of the center point is, the larger the radius $r(d_c)$ is. In one embodiment, the radius $r(d_c)$ can be decided by a predetermined function as a sum of exponentials shown in Equation (1).

$$r(p_C) = \eta(Ae^{Cd_c} + Be^{Dd_c}) \qquad (1)$$

where
$d_c$ denotes the depth value of the center pixel,
$r(d_c)$ denotes the radius of the circle,
$\eta, A, B, C, D$ are coefficients.

In an embodiment, the coefficients can be predetermined statistically, for example, in a specific implementation $\eta=0.05$, $A=242$, $B=0.6499$, $C=-0.00079$, $D=0.0011$. It should be appreciated the coefficients $\eta, A, B, C, D$ are not limited to any specific values. Values of the coefficients that can adapt the radius of the circle according to the relative size of a local area related to the center point can be applicable to the embodiments. For example, the radius of the circle can be in inverse proportion to the depth value of the center point. The larger the depth value of the center point is, the smaller the relative size of the local area related to the center point is.

Figure 3A:
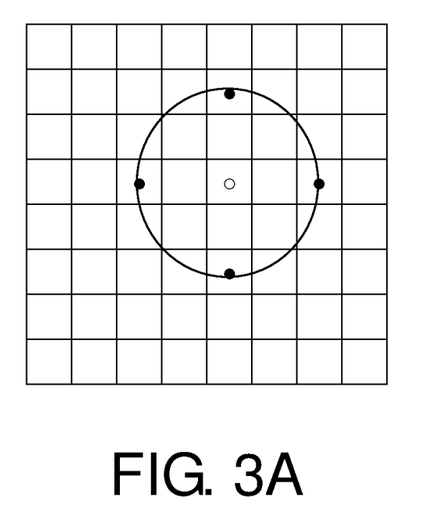
FIG. 3A illustrates a diagram of four pixels being selected as test points along a circle around a center point.
Figure 3B:
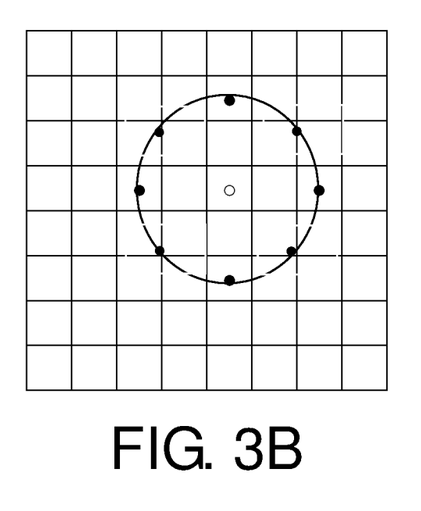
FIG. 3B illustrates a diagram of eight pixels being selected as test points along a circle around a center point.

As shown in block 230, a number of test points can be selected along the circle around the center point. It should be appreciated that the number of test points is not limited to any specific number. In one embodiment, the depth image may include sixty-four pixels as shown in FIGS. 3A and 3B. It should be appreciated that embodiments of the subject matter are not limited to the specific number of pixels in a depth image, and any number of pixels in a depth image is applicable. Examples of selecting test points are illustrated in FIGS. 3A and 3B.

In an embodiment, as shown in FIG. 3A, four pixels along the circle around the center point are selected as test points. Each of the test points placed on the circle may have a depth value $d_i$ (i=0, 1, 2, 3). If the sensor used to produce the depth image is properly calibrated, the depth values can be given directly in physical units, such as meters. And each of the depth values can be represented by binary bits (e.g. eight binary bits) in the signal processing.

In another embodiment, as shown in FIG. 3B, eight pixels along the circle around the center point are selected as test points. Each of the test points placed on the circle may have a depth value $d_i$ (i=0, 1, 2, ..., 7). If the sensor used to produce the depth image is properly calibrated, the depth values can be given directly in physical units, such as meters.

In another embodiment, if a test point is not at the center of a pixel, for example, some points among the eight test points along the circle around the center point are not at the center of the corresponding pixels, the depth value of the corresponding pixel may not be accurate to reflect the depth value of such a test point. In this case, the depth value of such a test point can be obtained by an interpolation of depth values of neighboring pixels. For example, the depth value of such a test point can be obtained by a bilinear interpolation of depth values of its two neighboring pixels or four neighboring pixels.

Referring back to FIG. 2, in block 240, a protuberance value $f_c$ of the center point is calculated based on a comparison between the depth value ($d_c$) of the center point and the depth value ($d_0, d_1, \ldots d_7$) of each of the selected eight test points in one embodiment. A positive comparison result $h_i$ is generated if the depth value $d_i$ of one test point is larger than the depth value $d_c$ of the center point, i.e. $\Delta d = d_i - d_c > 0$. The number of the positive comparison results associated with the selected eight test points is counted (i.e. accumulated) as $P_c$ as shown in Equation (2) to (4).

$$h_i = \delta(d_i - d_c) \quad (2)$$

$$\delta(\Delta d) = \begin{cases} 1 & \text{if } \Delta d > 0 \\ 0 & \text{otherwise} \end{cases} \quad (3)$$

$$p_c = \sum_{i=0}^{n-1} h_i \quad (4)$$

where n is the number of the selected test points.

The protuberance value $f_c$ of the center point is a function of the number of the positive comparison results $P_c$. The larger the number of positive comparison results $P_c$ is the larger the protuberance value $f_c$ of the center point is. The protuberance value $f_c$ describes how much a depth region (e.g. the center point) stands out from its surroundings, so that it can indicates the degree of protuberance of an object from surroundings.

In a further embodiment, the number of zero-crossings can be provided as an indication of degree of protuberance of an object. The depth value $d_c$ of the center point is subtracted from the depth value $d_i$ of each of the selected eight test points. If the signs of the subtracted results associated with one test point and its next neighboring test point flip, a zero crossing $s_i$ is generated. The number of zero-crossings associated with the selected eight test points is counted as $z_c$ as shown in Equation (5) to (7).

$$s_i = \varphi(i) \quad (5)$$

$$\varphi(i) = \begin{cases} 1 & \text{if the sign of } (d_{rem(i,n)} - d_c) \neq \\ & \text{the sign of } (d_{rem(i+1,n)} - d_c) \ 0 \leq i \leq n-1 \\ 0 & \text{otherwise} \end{cases} \quad (6)$$

$$z_c = \sum_{i=0}^{n-1} s_i \quad (7)$$

where rem(i, j) is the remainder left over after dividing i by j;

n is the number of test points, and in this example n is eight.

The protuberance value $f_c$ can be a function of the number of the zero-crossings $z_c$. The smaller the number of zero-crossings $z_c$ is the larger the protuberance value $f_c$ of the center point is.

In a further embodiment, the protuberance value $f_c$ can be a function of both the number of the positive comparison results $P_c$ and the number of the zero-crossings $z_c$.

$$f_c = \begin{cases} \frac{p_c}{2^{z_c/2-1}} & \text{if } 0 < z_c \leq n-1 \\ p_c & \text{if } z_c = 0 \end{cases} \quad (8)$$

The protuberance value $f_c$ as shown in equation (8) describes how uplifted a depth region (e.g. the center point) is from the surroundings, so that it may represent the degree of protuberant saliency of the depth region (e.g. the center point) from its surroundings. With both parameters, i.e. the positive comparison results $P_c$ and the number of the zero-crossings $z_c$, a more confident level of the protuberance value $f_c$ is provided to indicate the degree of protuberance of the center point.

Figure 4A:
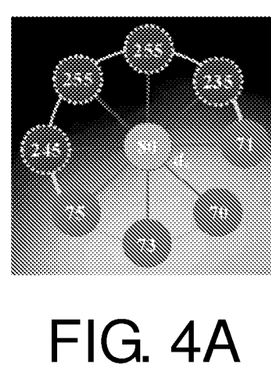
FIG. 4A and FIG. 5A illustrate depth values of a center point and test points and FIG. 4B and FIG. 5B illustrate comparison results starting from the top test point clockwise respectively, when sharing the same number of zero-crossings.
Figure 4B:
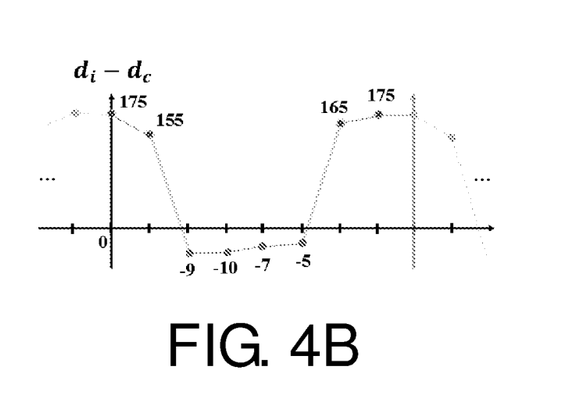
Figure 5A:
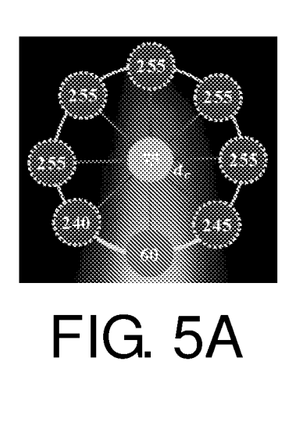
Figure 5B:
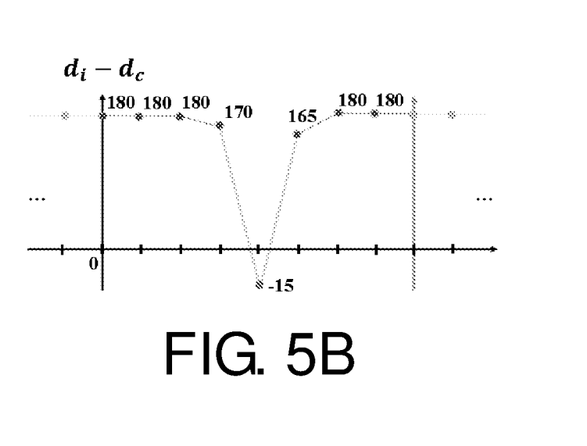

FIG. 4A and FIG. 5A illustrate the depth value $d_c$ of the center point and the depth values of the test points. FIG. 4B and FIG. 5B illustrate the comparison results starting from the top test point clockwise respectively. It shows that, when sharing the same number of zero-crossings (e.g. two zero-crossings shown in FIG. 4B and FIG. 5B), the larger the number of positive comparison results is the larger the protuberance value of the center point is.

Figure 6A:
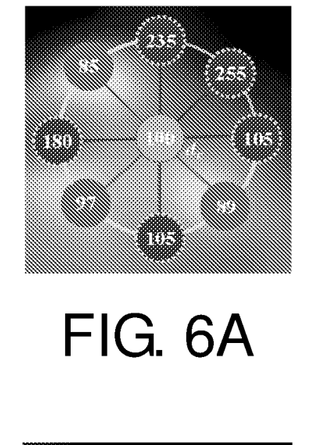
FIG. 6A and FIG. 7A illustrate depth values of a center point and test points and FIG. 6B and FIG. 7B illustrate comparison results starting from the top test point clockwise respectively, when sharing the same number of positive comparison results.
Figure 6B:
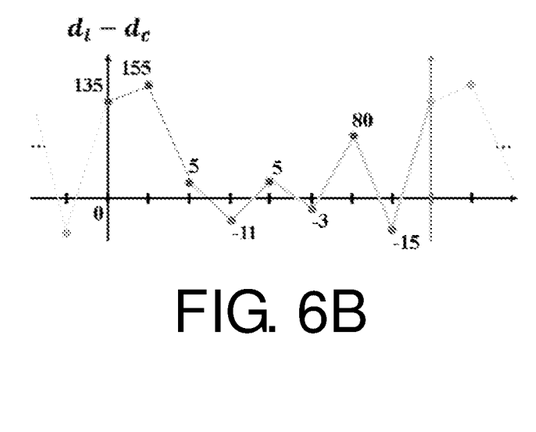
Figure 7A:
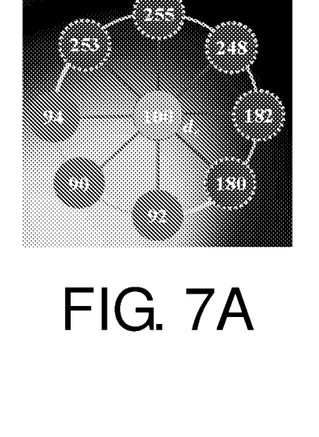
Figure 7B:
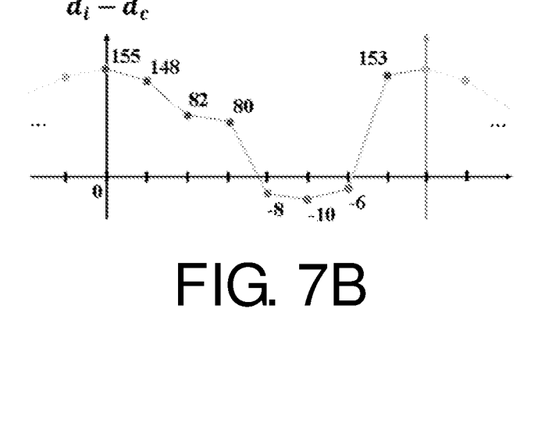

FIG. 6A and FIG. 7A illustrate the depth value $d_c$ of the center point and the depth values of the test points. FIG. 6B and FIG. 7B illustrate the comparison results starting from the top test point clockwise respectively. It shows that, when sharing the same number of positive comparison results (e.g. five positive comparison results shown in FIG. 6B and FIG. 7B), the smaller the number of zero-crossings is the larger the protuberance value of the center point is.

Figure 8:
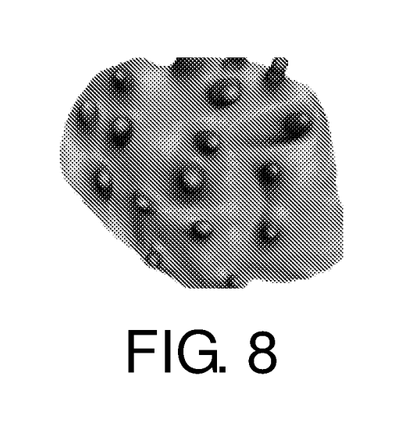
FIG. 8 illustrates exemplary protuberant bumps on an uneven surface.

Referring back to FIG. 2, in block 250, each pixel in the depth image (e.g. each pixel among the sixty-four pixels in the embodiment shown in FIG. 3B) is taken as the center point to calculate the protuberance value $f_c$ based on a comparison between the depth value ($d_c$) of the center point and the depth value ($d_0, d_1, \ldots d_7$) of each of the selected eight test points. That is, each pixel in the depth image will be mapped into a protuberance value in a protuberant saliency map. One or more salient points of the protuberant object, e.g. a fingertip of a hand or a finger, can be determined based on the protuberance values in the protuberant saliency map. In other words, such protuberant saliency map may highlight one or more protuberant bumps on an uneven surface as illustrated in one embodiment shown in FIG. 8. By calculating the protuberance value of each pixel in the depth image, one or more salient points of the protuberant object can be determined. The salient point detection of a protuberant object has practical applications. For example, fingertip detection is an important technology for Natural User Interface (NUI).

In a further embodiment, in block 260, the protuberance value (e.g. $f_i$) of a pixel in the protuberant saliency map can be balanced by a corresponding depth value of the pixel (e.g. $d_i$, the depth value of pixel i in the depth image). In particular, the balance may comprise: the protuberance value (e.g. $f_i$) is multiplied by a normalized depth value $g_i$, where $g_i$=n (255−$d_i$), n(·) is a normalization function to set the depth range between 0 and 255, 0<$d_i$<255.

In an example, the normalized depth value $g_i$ may be calculated by reversing and stretching the depth value $d_i$ though the following equation (9) and (10)

$$g_i = n(255 - d_i) \text{ where } 0 < d_i \leq 255 \quad (9)$$

$$n(d) = \begin{cases} \frac{255}{255 - d_{th}}(d - d_{th}) & d > d_{th} \\ 0 & \text{otherwise} \end{cases} \quad (10)$$

where $d_i$ denotes the depth value of the pixel i,
$g_i$ denotes the normalized depth value of the pixel i,
$d_{th}$ denotes a threshold for the stretching operation.

In an example, the $d_{th}$ may be selected as 204, which enables a stretching of 5 multiplications. It should be appreciated the $d_{th}$ is not limited to a certain value.

In the example where a depth value is normalized to 0 to 255, the value 255 represents the maximum depth value of a pixel in the depth image. It should be appreciated that the maximum depth value $d_{max}$ is not limited to 255 and may be other value depending on the normalization range of the depth value.

A protuberant saliency map can be represented as protuberance term $F_c$ which consists of a plurality of protuberance values $f_i$ (index c in $F_c$ represents that pixel i in the depth image is regarded as the center point of a circle to calculate the protuberance value $f_i$). Each depth value of pixel i in the depth image can be normalized by function n(·), and all normalized depth values may constitute a nearness map represented as a nearness term $G_c$ (index c in $G_c$ represents that corresponding pixel i in the depth image is regarded as the center point of a circle to calculate the protuberance value $f_i$). Both protuberance term $F_c$ and nearness term $G_c$ can be matrixes.

Each protuberance value $f_i$ in the protuberance term $F_c$ is multiplied by the normalized depth value $g_j$ associated with the corresponding pixel in the nearness term $G_c$ as in the following equation (11) to obtain a geometry energy $E_c$. The geometry energy can provide an enhanced indication of saliency of the protuberance region (e.g. the center point) as it takes both the protuberance and nearness into account.

$$E_c = |F_c \cdot G_c| \quad (11)$$

Figure 9:
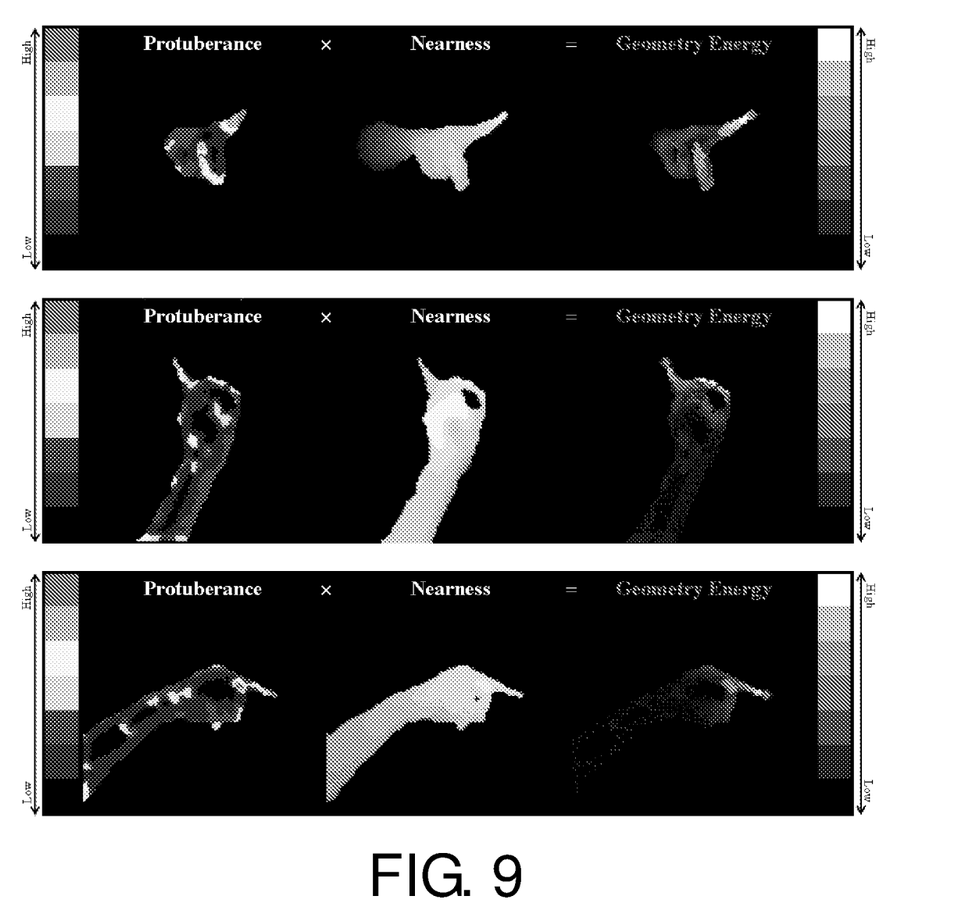
FIG. 9 illustrates exemplary protuberance, nearness and geometry energy for a fingertip in different orientation states.

Based on the above equation to obtain a geometry energy $E_c$, a geometry energy map is obtained by calculating the geometry energy value for each pixel in the depth image. FIG. 9 illustrates the protuberance, nearness and geometry energy for a fingertip in different orientation states.

In an example, a point with the maximum geometry energy in the geometry energy map can be recognized as a salient point of a protuberant object such as a fingertip, a gunpoint, a tip of stick or the like.

The geometry energy map can be further used to detect a protuberance object in combination with other approaches. For example, a regression-based approach or a classification-based approach can be applied to the geometry energy values in the geometry energy map (i.e. the balanced protuberance value of each pixel in the depth image). A mapping to a pre-defined set of object features can be determined in the geometry energy map based on pre-trained models by using the regression-based approach or the classification-based approach, and then an object corresponding to the set of object features may be detected in the geometry energy map. For example, the pre-trained models may correspond to mouth, ear and leg of a dog, mouth and fin of a fish, a finger, a hand, and so on. For example, a hand or a hand along with forearm can be detected as the protuberant object. For example, a finger or fingers of the hand can be detected as the protuberant object. Examples of the regression-based approach or classification-based approach may include Random Ferns, Random Decision Forests, Convolutional Neural Network (CNN), Support Vector Machine (SVM), etc.

The method for detecting a protuberant object should not be limited to the blocks mentioned above. It will be apparent to those skilled in the art that the various aspects of the subject matter claimed can be practiced in other examples that depart from these specific details.

As described in the above embodiment, the radius r($d_c$) of the circle is determined based at least in part on the depth value $d_c$ of the center point, shown in block 220.

The test points are placed along the circle symmetrically as shown in FIG. 3A and FIG. 3B. In an alternative embodiment, the test points can be arranged along the circle unsymmetrically.

Although some equations are provided above as examples, a person skilled in the art can understand that these equations can be changed but not depart from the spirit of the subject matter. For example, the number of zero-crossings can be counted in accordance with the following equation (12) instead of above equations (5)-(7).

$$z_c = \sum_{i=0}^{n-1} |h_{rem(i,n)} - h_{rem(i+1,n)}| \quad (12)$$

Where the definition of h refers to equation 2 and equation 3 as described in the above embodiment; n is the number of test points; rem(i, j) is the remainder left over after dividing i by j.

Further, as described in the above embodiments, the protuberance value $f_c$ of the center point is calculated based on a comparison between the depth value ($d_c$) of the center point and the depth value ($d_0$, $d_1$, . . . $d_7$) of each of the selected eight test points. Those skilled in the art will appreciate that although the test points related to a center point are selected based on one radius value, the subject matter is not so limited. In an embodiment, the protuberance value $f_c$ can be calculated with a coarse-to-fine strategy to alleviate the effect of depth noise. Multiple radii may be used with respect to a center point based on the coarse-to-fine strategy. For example, after a radius of 5 pixel-length is determined by using equation (1), two additional radii of 6 pixel-length and 7 pixel-length, which are obtained by incrementing the radius, can be used to select the test points and calculate the corresponding protuberance value $f_c$ of the center point. It should be appreciated that the number of radii is not limited to a certain number such as 3, and the incrementing amount is not limited to a certain value such as 1. In one embodiment, the three radii may be used to obtain three protuberance values of a center point, and among the three calculated protuberance values, the protuberance value with the highest appearance frequency (i.e. how many times a value appears) can be eventually voted as the protuberance value of the center point. In another embodiment, the three calculated protuberance values can be averaged as the protuberance value of the center point.

A person skilled in the art can understand that the above methods for detecting a protuberant object can be used to detect fingertip(s) or finger(s) of one human's hand, it is possible to detect fingertips or fingers of human's both hands (e.g. both hands can be identified as two objects). The above method can even be applied to detect fingertips or fingers of different human's hands, e.g. different hands are recognized as different objects.

It should be understood that the elements described in the above blocks may be implemented in various forms of hardware, software or combinations thereof.

Figure 10:
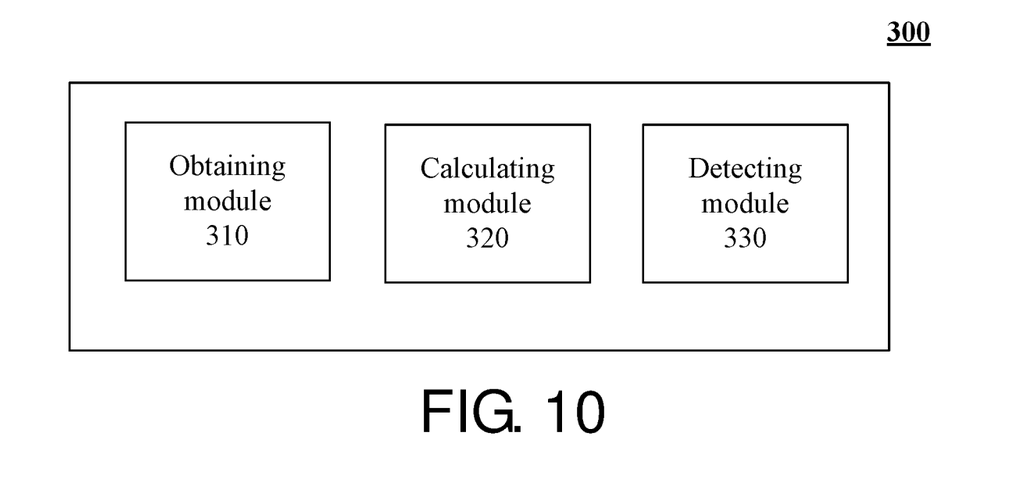
FIG. 10 illustrates a block diagram of an apparatus for detecting a protuberant object according to one embodiment of the subject matter.

An exemplary apparatus 300 for detecting a protuberant object is shown in FIG. 10. The apparatus 300 may include an obtaining module 310, a calculating module 320 and a detecting module 330. The apparatus 300 may be an embodiment of the computing device 40 of FIG. 1 or may be implemented in the computing device 40.

The obtaining module 310 may obtain a depth image of a protuberant object. In a scenario, the obtaining module 310 may obtain depth images while the sensor 20 captures the depth images in real time. In another scenario, the obtaining module 310 may obtain depth images stored in a storage device. The calculating module 320 may calculate the protuberance value and/or the geometry energy value of each pixel of the depth image. In an embodiment, the calculating module 320 may calculate the protuberance value of each pixel of the depth image through the operations as described with reference to at least one of blocks 220, 230 and 240 of FIG. 2. In another embodiment, the calculating module 320 may calculate the geometry energy value of each pixel of the depth image through the operations as described with reference to at least one of blocks 220, 230 240, and 260 of FIG. 2. The detecting module 330 may detect one or more salient points of the protuberant object by using the protuberance value or the geometry energy value of each pixel in the depth image. In an embodiment, the detecting module 330 may choose one or more points with the maximum protuberance value(s) or with the maximum geometry energy value(s) as the one or more salient points. In another embodiment, the detecting module 330 may detect the protuberance object based on the protuberance values or the geometry energy values of each pixel of the depth image (e.g. the protuberant saliency map or the geometry energy map) in combination with other approaches such as the regression-based approach or the classification-based approach as described above. It should be appreciated that the obtaining module 310, the calculating module 320 and the detecting module 330 may perform the respective operations or functions as described in various embodiments of the subject matter.

The obtaining module 310, the calculating module 320 and the detecting module 330 may be implemented in various forms of hardware, software or combinations thereof. In an embodiment, the modules may be implemented separately or as a whole by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. In another embodiment, the modules may be implemented by one or more software modules, which may be executed by a general central processing unit (CPU), a graphic processing unit (GPU), a Digital Signal Processor (DSP), etc.

Figure 11:
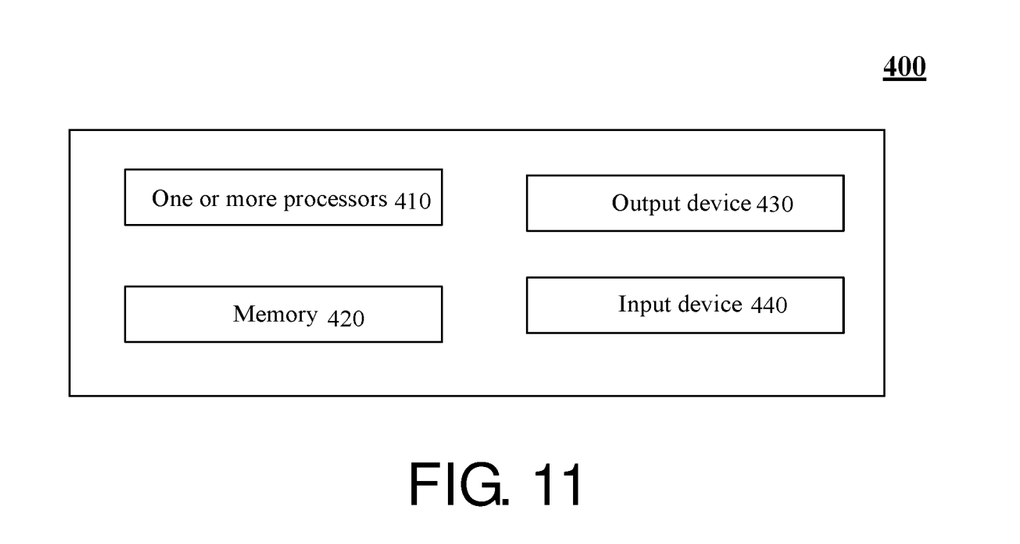
FIG. 11 illustrates a block diagram of a computer system for detecting a protuberant object according to one embodiment of the subject matter.

An exemplary computer system 400 for detecting a protuberant object is shown in FIG. 11. According to one embodiment, a general-purpose computing system may serve as an operator controller. The controller may include one or more processors 410 that execute one or more computer readable instructions (i.e. the elements in above blocks implemented in the form of the software) stored or encoded in computer readable storage medium (i.e. memory) 420 local or remote to the computing system. Software resident on the controller allows the operator to control operation of the system. The apparatus may also include an output device 430 such as display and an input device 440 such as a keyboard, mouse, touch screen, etc.

According to an embodiment, a program product such as a machine-readable medium is provided. The machine-readable medium may have instructions (i.e. the elements in above blocks implemented in the form of the software) thereon which, when executed by a machine, cause the machine to perform the method according to various embodiments of the subject matter.

According to techniques described herein, the protuberance value of the center point is calculated based on a comparison between the depth value ($d_c$) of the center point and the depth value ($d_0, d_1, \ldots d_7$) of each of the selected eight test points. That is, the protuberant saliency is obtained only based on the depth image. Since the depth image is robust to illumination variation, the detection method according to the subject matter does not depend upon the appearance contrast between the object and its surrounding region. The reliability of the detection method and apparatus is improved accordingly.

Further, by virtue of the advantage of the depth image which unambiguously encodes the surface metric dimensions of the protuberant object, the test points placed on a circle around the center point and the algorithm based on a comparison between the depth value of the center point and the depth value of each of the test points, the detection method and apparatus according to the subject matter present good performance under the condition of large rotation and isometric deformation, the varying view point of a sensor, as well as the low resolution depth information.

Since the protuberant saliency is determined by using only a single channel (i.e. protuberance values in the protuberant saliency map), compared with other methods in the prior art which use different channels such as R(Red) color channel, G (Green) color channel, B (Blue color channel) and D (Depth) channel, the detection method and apparatus according to the subject matter enable fast computation.

With a wide horizon of development of salient object detection, the detection method and apparatus according to the subject matter will have wide applications in many fields such as object recognition, resize of image and image retrieval.

It should be noted that the above-mentioned solutions illustrate rather than limit the subject matter and that those skilled in the art would be able to design alternative solutions without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the system claims enumerating several units, several of these units can be embodied by one and the same item of software and/or hardware. The usage of the words first, second and third, et cetera, does not indicate any ordering. These words are to be interpreted as names.

The invention claimed is:

1. An image processing method, comprising:
   obtaining a depth image of a protuberant object;
   selecting a plurality of test points placed on a circle around a pixel in the depth image as a center point of the circle;
   calculating a protuberance value of the center point based on a comparison between the depth value of the center point and the depth value of each of the selected test points, wherein a coarse-to-fine strategy with two or more radii is applied to calculate the protuberance value of the center point; and
   determining one or more salient points of the protuberant object by using the protuberance value of each pixel in the depth image.

2. The method of claim 1, wherein a radius of the circle is determined based at least in part on the depth value of the center point.

3. The method of claim 1, wherein the test points are symmetrically placed on the circle.

4. The method of claim 1, the calculating comprising:
   counting a number of positive comparison results associated with the selected test points, wherein a positive comparison result is generated if the depth value of one test point is larger than the depth value of the center point,
   wherein the larger the number of positive comparison results is the larger the protuberance value of the center point is.

5. The method of claim 4, the calculating further comprising:
   subtracting the depth value of the center point from the depth value of each of the selected test points; and
   counting a number of zero-crossings associated with the selected test points, wherein a zero crossing is generated if a sign of a subtracted result associated with one test point is different from a sign of a subtracted result associated with its neighboring test point,
   wherein the smaller the number of zero-crossings is the larger the protuberance value of the center point is.

6. The method of claim 1, wherein the coarse-to-fine strategy comprises voting the calculated protuberance value with a highest appearance frequency is voted as the protuberance value of the center point.

7. The method of claim 1, wherein the coarse-to-fine strategy comprises voting the calculated protuberance values are averaged as the protuberance value of the center point.

8. The method of claim 1, further comprising:
   balancing the protuberance value of each pixel in the depth image with a corresponding depth value of the pixel.

9. The method of claim 8, the balancing comprising:
   normalizing the depth value of the center point; and
   multiplying the protuberance value of the center point with the normalized depth value of the center point.

10. The method of claim 8, further comprising:
    applying a regression-based approach or a classification-based approach to the balanced protuberance value of each pixel in the depth image.

11. The method of claim 10, wherein the regression-based approach or classification-based approach comprises one of the following approaches: Random Ferns, Random Decision Forests, Convolutional Neural Network (CNN), Support Vector Machine (SVM).

12. An image processing apparatus, comprising:
    at least one processor; and
    memory including instructions that, when executed by the at least one processor, cause the at least one processor to perform operations to:
    obtain a depth image of a protuberant object;
    select a plurality of test points placed on a circle around a pixel in the depth image as a center point of the circle, and calculate a protuberance value of the center point based on a comparison between the depth value of the center point and the depth value of each of the selected test points, wherein a coarse-to-fine strategy with two or more radii is applied to calculate the protuberance value of the center point; and
    detect one or more salient points of the protuberant object by using the protuberance value of each pixel in the depth image.

13. The apparatus of claim 12, the memory further comprising instructions that cause the at least one processor to determine a radius of the circle based at least in part on the depth value of the center point.

14. The apparatus of claim 12, the memory further comprising instructions that cause the at least one processor to count a number of positive comparison results associated with the selected test points, wherein a positive comparison result is generated if the depth value of one test point is larger than the depth value of the center point,
    wherein the larger the number of positive comparison results is the larger the protuberance value of the center point is.

15. The apparatus of claim 14, the memory further comprising instructions that cause the at least one processor to:
    subtract the depth value of the center point from the depth value of each of the selected test points; and
    count a number of zero-crossings associated with the selected test points, wherein a zero crossing is generated if a sign of a subtracted result associated with one test point is different from a sign of a subtracted result associated with its neighboring test point,
    wherein the smaller the number of zero-crossings is the larger the protuberance value of the center point is.

16. The apparatus of claim 12, the memory further comprising instructions that cause the at least one processor to balance the protuberance value of each pixel in the depth image with a corresponding depth value of the pixel.

17. The apparatus of claim 16, the instructions to perform the balancing further comprising instructions that cause the at least one processor to:
    normalize the depth value of the center point; and
    multiply the protuberance value of the center point with the normalized depth value of the center point.

18. The apparatus of claim 16, the memory further comprising instructions that cause the at least one processor to apply a regression-based approach or a classification-based approach to the balanced protuberance value of each pixel in the depth image.

19. A computer system, comprising:
    one or more processors; and
    a memory storing computer-executable instructions that, when executed, cause the one or more processors to:
    obtain a depth image of a protuberant object;
    select a plurality of test points placed on a circle around a pixel in the depth image as a center point of the circle;

calculate a protuberance value of the center point based on a comparison between the depth value of the center point and the depth value of each of the selected test points, wherein a coarse-to-fine strategy with two or more radii is applied to calculate the protuberance value of the center point; and determine one or more salient points of the protuberant object by using the protuberance value of each pixel in the depth image.

* * * * *